Oct. 5, 1965    C. L. LEHMAN    3,209,840
CULTIVATOR
Filed Sept. 5, 1961    4 Sheets-Sheet 1
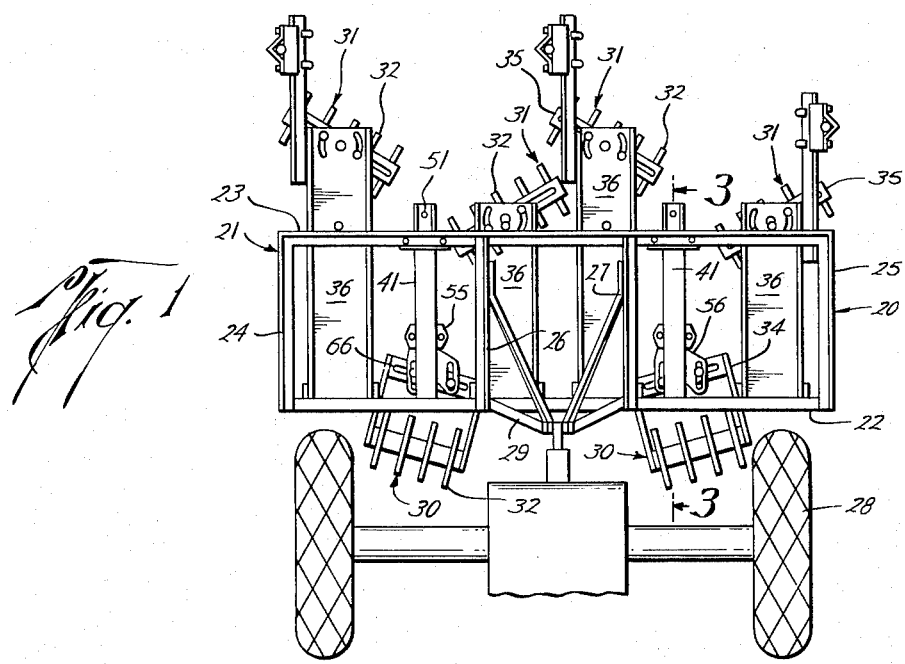
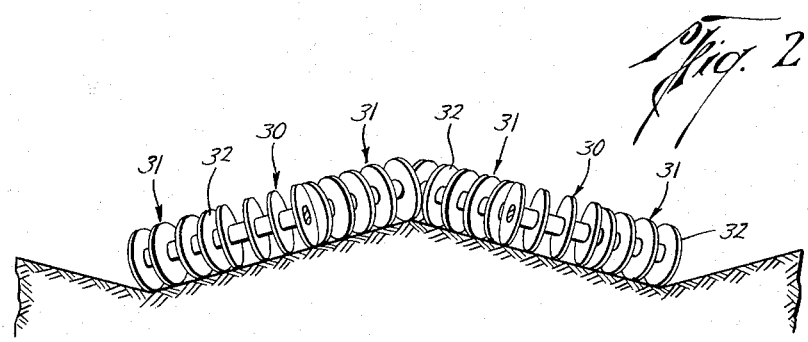
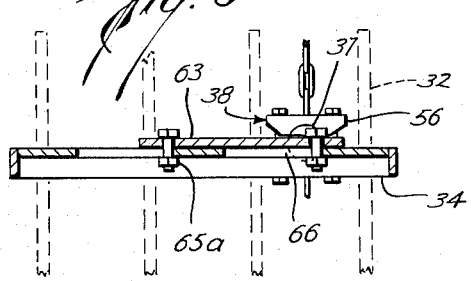
Charles L. Lehman
INVENTOR.
BY
ATTORNEYS

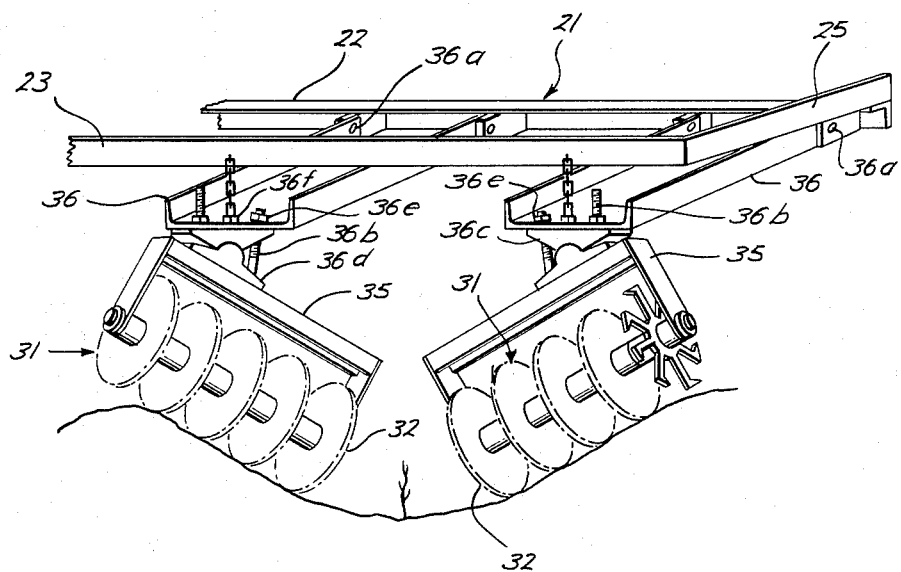

Oct. 5, 1965     C. L. LEHMAN     3,209,840
CULTIVATOR
Filed Sept. 5, 1961     4 Sheets-Sheet 3
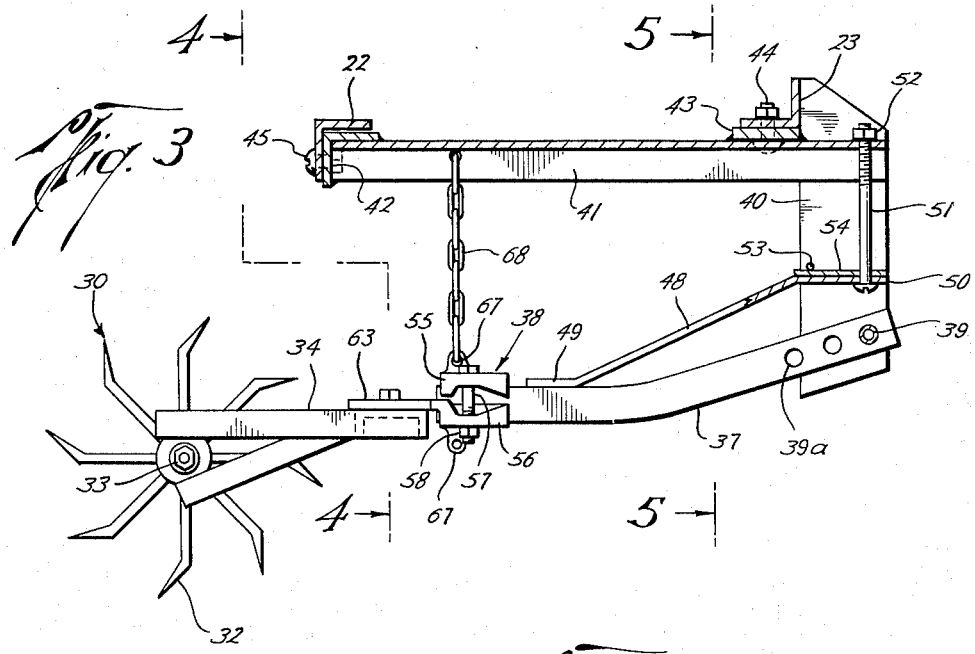
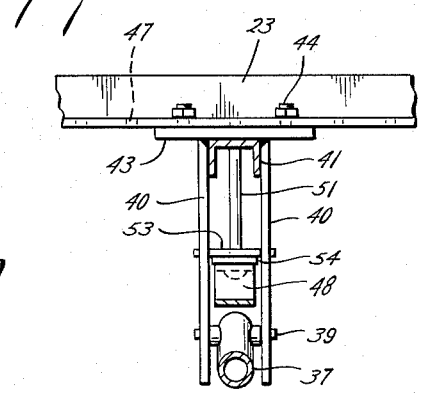
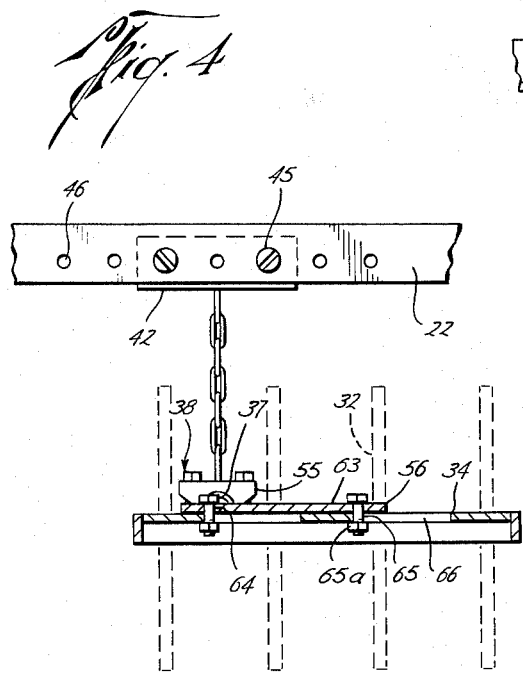
Charles L. Lehman
INVENTOR.
BY
ATTORNEYS Oct. 5, 1965 C. L. LEHMAN 3,209,840
CULTIVATOR
Filed Sept. 5, 1961 4 Sheets-Sheet 4

Charles L. Lehman
INVENTOR.

BY Browning, Simms, Hyer & Eickenroht
ATTORNEYS

United States Patent Office 3,209,840
Patented Oct. 5, 1965

3,209,840
CULTIVATOR
Charles L. Lehman, Rte. 3, Box 53, Corpus Christi, Tex.
Filed Sept. 5, 1961, Ser. No. 135,919
8 Claims. (Cl. 172—584)

This invention relates in general to row crop cultivators; and, more particularly, to improvements in the type of cultivator shown in U.S. Patent No. 2,994,387.

In the cultivator of this patent, a plurality of gangs of rotary hoes are individually mounted on a frame by means of beams which swing about transverse axes to permit the gangs to rotatably engage spaced-apart row crops as well as the ground between the crops. More particularly, the row crops are engaged by front gangs which are pushed by means of forwardly extending beams, and the ground between such row crops is engaged by rear gangs which are arranged in pairs, one on each side of a row, and pulled by means of rearwardly extending beams.

Each gang is supported from its beam by means of a clamp which permits it to be swung about a vertical axis in adjusting the angular relation of the path of rotation of the hoes with respect to the forward movement of the frame. This adjustment of the front gangs regulates the extent to which weeds are chopped from the crops. It also permits the operator to turn the rear gangs on each side of the row crop between positions for either throwing dirt onto or pulling it from the crops.

The clamp for supporting each rear gang from its beam is preferably of such construction to permit such gang to be tilted from one side to the other of a level position. This is useful in the cultivation of either high or low planted crops as it enables each rear gang to be adjusted to the contour of the side of the row. Also, in the preferred form of the cultivator shown in such earlier patent, the beams for the front and rear gangs are crisscrossed in side-by-side relation to thereby reduce the length of the cultivator to a minimum.

The rotary hoes of each gang comprise spiders having radially extending legs which are bent at their outer ends. When the cultivator is used for chopping weeds from the crops, the ends of the hoes of the front gangs preferably extend in a rearward direction as they engage the row. However, it may be desirable to reverse the direction of the bent ends of the hoes when they are used as mere scratches or for other more conventional cultivating purposes.

Although this cultivator has been operated very successfully in practically all instances, there are some applications to which it is not readily adaptable. One such application is the cultivation of row crops of a width considerably greater than the span of one front gang and the adjacent pair of rear gangs ordinarily used in cultivating a row. For example, the width of the rows may be double that of the ordinary rows for which the cultivator is designed. As a result, each front gang engages the ground on the side of the row, and thus along a level other than the contour of the ground, whether the crop is planted low or high. A similar result occurs in the case of crops which are planted on the side of the row, and away from the prevailing wind, even when such rows are of the ordinary width for which the cultivator is designed.

Another application for which the earlier cultivator is not particularly well suited is the cultivation of narrow row crops. Thus, the aforementioned side-by-side disposition of the beams for the front and rear gangs places a practical limitation on the lateral adjustment of the front gangs, at least without interference with the beams for the rear gangs. Still further difficulty has been encountered in converting the cultivator between the aforementioned uses in chopping cotton and scratching. For example, this has heretofore required the operator to detach each front gang from its beam in order to reverse the direction of the bent ends of the spiders.

An object of this invention is to provide a cultivator of this general type which retains all the advantages of the earlier cultivator, but is also adaptable for cultivating these wider rows as well as rows in which the crop is planted on the side thereof; and, more particularly, which is adjustable across its entire width to the contour of such row or rows.

Another object is to provide a cultivator in which front gangs are supported by means of beam clamps which are adjustable to permit such front gangs to be moved closer to the beams for the rear gangs, in the case of narrow rows, and to permit such front gangs to be turned to the contour of the side of wide rows or side planted rows.

A further object is to provide a cultivator having such clamps for the front gangs which are so constructed and connected to the beams that they may be adjusted to a wide extent laterally of the beam with a minimum of effort and without disturbing the elevation of the gang with respect to such beam.

Still another object is to provide a clamp for a cultivator beam of the type described which permits the gang supported thereby to be separately and independently adjusted for angle and tilt.

A still further object is to provide such a cultivator having a simplified and inexpensive means for urging the front gangs onto the ground with an adjustable force.

Yet another object is to provide such a cultivator having front gangs which may be adjusted between scratching and preferred weed chopping positions without detachment from the beams supporting them.

Other objects, advantages and features of this invention will be apparent to one skilled in the art upon consideration of the written specification, the attached claims and the annexed drawings.

In the drawings, wherein like reference characters are used throughout to designate like parts:

FIG. 1 is a plan view of a cultivator constructed in accordance with the present invention;

FIG. 2 is a view of the gangs of rotary hoes of the cultivator of FIG. 1, as seen from the front thereof and positioned to cultivate a wide row, and particularly a row corresponding in width to the over-all cultivator;

FIG. 2A is a perspective view from the rear end of the cultivator with the front gangs removed;

FIG. 3 is a cross-sectional view of the cultivator on an enlarged scale, and as seen along broken line 3—3 of FIG. 1;

FIG. 4 is a front view of part of the cultivator, as seen along broken line 4—4 of FIG. 3, and with the front gang shown therein moved to its rightmost position with respect to the beam supporting it;

FIG. 5 is another sectional view of part of the cultivator, as seen along broken line 5—5 of FIG. 3;

FIG. 6 is a view similar to the lower half of FIG. 4, but showing the front gang reversed on its beam to dispose it in its leftmost position with respect thereto;

Figure 7:
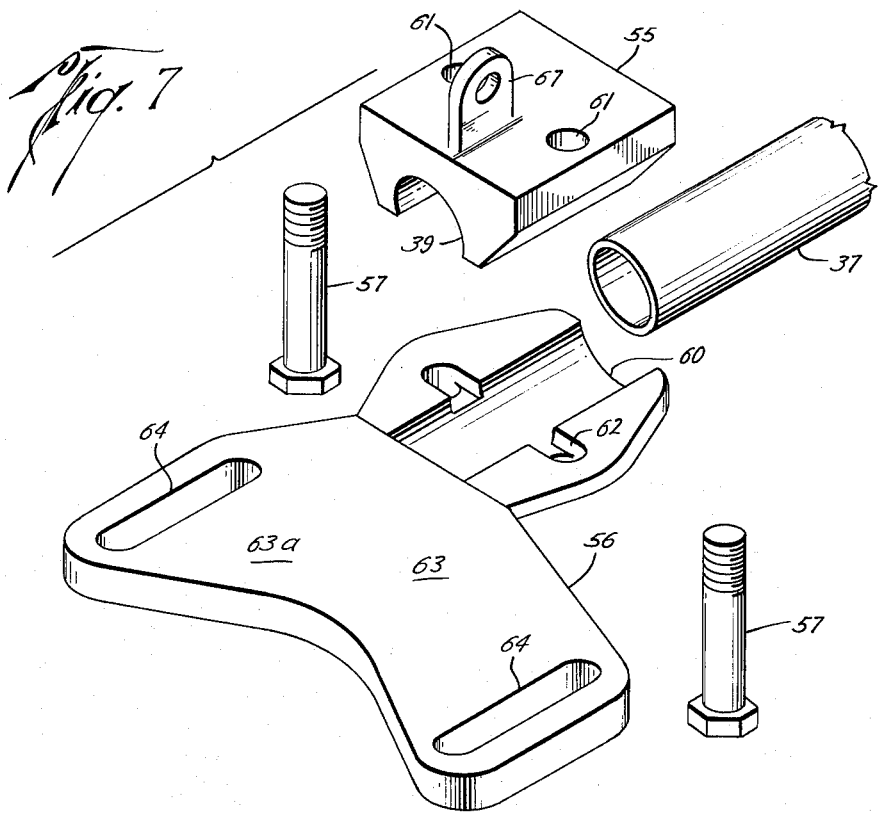
FIG. 7 is an exploded view on a further enlarged scale of the clamp for supporting each front gang from its beam.

With reference now particularly to the above-described drawings, the cultivator 20 is shown in FIG. 1 to comprise a rectangular frame 21 having a front member 22 and a rear member 23 connected by side members 24 and 25 as well as by intermediate braces 26 and 27. The frame is adapted to be moved forwardly over the ground by means of a tractor 28 or other vehicle to which it is connected by a conventional three point hitch 29 or the like. As shown in FIGS. 3, 4 and 5, the front and rear of frame members 22 and 23 comprise angle irons, the front one being turned rearwardly and downwardly and the rear one being turned forwardly and upwardly.

There are front gangs 30 and rear gangs 31 mounted on the frame, each such gang comprising a plurality of rotary hoes 32 (shown diagrammatically in all but FIGS. 2A and 3) made up of spiders supported for rotation about an axle 33. The axle for the hoes of each front gang is supported on the forward end of a substantially horizontally extending U-shaped bracket 34, while the axle for the hoes of each rear gang 31 is supported upon a substantially vertically extending U-shaped bracket 35, as shown in FIG. 2A and the aforementioned patent.

In any case, the front gangs 30 are mounted in laterally spaced-apart relation so that, in accordance with the usage illustrated in the earlier patent, each such gang may engage a row of crops as the frame is moved forwardly. As previously mentioned, the bent ends of the spiders of the front gangs normally extend forwardly at their engagement with the row as this enables a better weed chopping action. There is a pair of rear gangs 31 for each front gang, each rear gang of the pair being disposed for engagement with the ground rearwardly and on each opposite side of the ground engaged by the front gang. Thus, when the cultivator 20 is used for cultivating two spaced-apart rows of crops, each of the pair of rear gangs moves over the ground intermediate the rows of crops.

The rear gangs 31 may be swung between rearwardly convergent or divergent positions so that, when used in cultivating two rows of crops, they may turn the ground onto or pull it away from the row of crops. Also, and again as more fully described in the aforementioned patent, each rear gang 31 is tiltable from one side to the other of a level position with respect to the ground so that the rear gangs may follow the contour of the sides of the rows of crops, whether the crops be planted high or low.

The means of adjusting as well as the mounting of the rear gangs 31 from the frame 21 is shown in FIGS. 1 and 2A. Thus, each of the rear gangs 31 is mounted on the frame by means of relatively wide beams 36 which are pivotally mounted to the front frame member 22 by means of pins 36a (FIG. 2A) for extension rearwardly therefrom in order to pull the rear gangs over the ground. As also shown in FIG. 2A, each bracket 35 is supported from the end of a beam by means of a pair of bolts 36b disposed on opposite sides of castings 36c and 36d on the underside of the beam and top side of the bracket, respectively. As fully described in the aforementioned patent, these castings have inter-fitting semi-cylindrical portions which permit the brackets to be swung into desired tilted positions merely upon loosening of nuts 36e on the bolts. Then, upon tightening of the nuts, the brackets and thus the gangs supported from them are held in such positions.

As also fully described in the aforementioned patent, the gangs may be swung between rearwardly convergent and divergent positions by means of arcuate slots on the ends of the beams 36 through which the bolts 36b extend, as shown in FIG. 1. As also indicated in FIG. 1 and shown in the aforementioned patent, these bolts also pass through slots extending across the brackets 35 to permit the gangs to be adjusted in a lateral direction. More particularly, the brackets and castings are caused to swing about central pivot pins (not shown) extending through them and the beams and held in place by nuts 36f. Obviously, beams of this same width for supporting the front gangs 30 would severely limit the disposal of the front gangs laterally closer to the tracking of the rear gangs.

For this and other reasons, each front gang 30 is swingably mounted on the frame by means of a narrow beam 37 pivotally connected to the rear of the frame and extending forwardly therefrom in order to be pushed as in the case of the aforementioned patent. This narrow beam 37 is preferably in the form of a pipe which is not only advantageous because of its light weight, availability and flexibility, but also because of its circular exterior cross section. Thus, this cross section of the beam facilitates the disposal of a clamp 38 connecting a front gang 30 thereto in any desired rotative position thereabout, so that the gang may be tilted to a position following the contour of the ground over which it is to be moved and then fixed in such position during the cultivating operation.

For example, in cultivating the wide row of crops shown in FIG. 2, both front gangs 30 may be tilted to the illustrated positions in line with the tilted position of the rear gangs 31, whereby the entire cultivator, including the rear gangs, will follow the contour of the single row of crops. Also, although such an operation is not illustrated, it will be understood that the front gangs may be tilted to follow the contour of the sides of relatively narrow rows when the crops are planted on such side away from the prevailing wind.

As best shown in FIG. 3, each beam 37 is pivotally connected to the rear end of the frame by means of pins 39 extending through one selected hole 39a therein and mounted at their opposite ends within spaced-apart plates 40. These plates are connected as by welding to the opposite sides of an inverted channel 41 extending therebetween and forwardly to a header 42 adjacent the front frame member 22. More particularly, the channel is connected as by welding to a plate 43 which is in turn supported from the rear frame member 23 by bolts 44. The header 42 on the front end of channel 41 is connected to the back side of front frame member 22 by bolts 45. As shown in FIGS. 4 and 5, the bolts 45 and 44 are interchangeably received within spaced-apart openings 46 and 47, respectively, in the front and rear frame members. This permits the plates 40 and header 42, and thus the beam 37, to be adjusted laterally with respect to the frame 21.

Each beam 37, and thus the front gang 30 supported therefrom, is urged downwardly by means of a strap of spring metal 48 having a front end 49 bearing on the top of the beam and a rear end 50 supported from the frame by means of a bolt 51. As shown in FIG. 3, the bolt extends upwardly through the inverted channel 41 and is held in supporting position by means of a nut 52 bearing upon the top side of the channel. A pin 53 extends through the sides of the plates 40 to bear upon a plate 54 above an intermediate portion of the strap 48. Obviously, when the effective lengths of the bolt 51 is shortened by taking up on the nut 52, the pin 53 will act as a fulcrum in increasing the force with which the front end 49 strap bears upon the beam 47 and thus the front gang. Thus, the operator can adjust the force with which each forward gang is urged into engagement with the ground merely by manipulating the nut 52.

Figure 8:
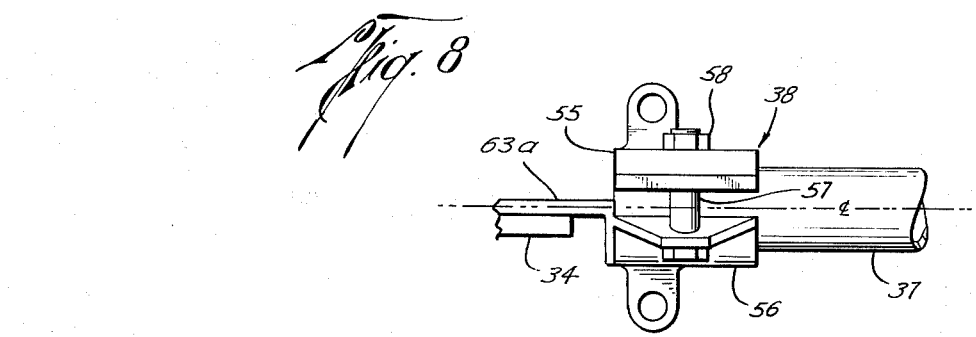
FIG. 8 is a side view of the clamp connected about the beam and supporting a gang in the position of FIG. 6.
Figure 9:
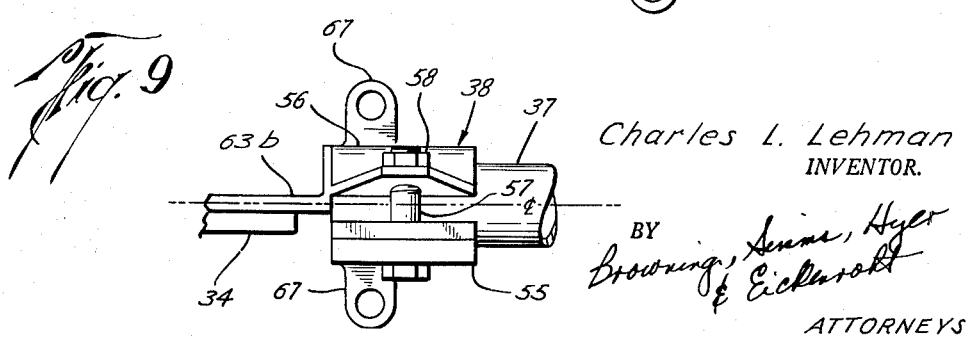
FIG. 9 is a side view of the clamp similar to FIG. 8, but showing the clamp reversed in position to dispose the gang in the position of FIG. 4.

Each clamp 38 includes segments 55 and 56 which are releasably connectable about the forward end of the shaft 37 by means of bolts 57 and nuts 58. More particularly, and as best shown in FIG. 7, the segments 55 and 56 have arcuate recesses 59 and 60, respectively, closely fittable about the beam 37 to dispose their opposite edges closely adjacent one another, as best shown in FIGS. 8 and 9. These segments also have openings 61 and 62 therein which are aligned with one another to receive the bolts 57 when the segments are so fitted. Obviously, the nuts 58 may be loosened on the bolts 57 to permit the clamp segments to be swung to any desired rotative position with respect to the axis of the beam 37 and then tightened in order to adjust the tilt of the gang 30.

If desired, the clamp may be swung approximately 180° about its beam to change the earth turning characteristics of the front gang by disposing the bent ends of the spiders thereof in either forwardly or rearwardly directed relation with respect to the ground level at engagement therewith. Thus, for example, the gang 30 of FIG. 3 may in effect be turned upside down to change the direction of the bent ends of the spiders thereof from one best suited for weed chopping to the one best suited for scratching.

The segment 56 of each clamp has a flange 63 which extends forwardly from the portion of such segment in which the recess 60 is disposed. Also, and for the purpose to be described, the flange 63 extends laterally to one side of the axis of the recess, as best shown in FIG. 7, and has oppositely facing sides 63a and 63b for fitting against the flat side of U-shaped bracket 34 in either upright or inverted position. That is, the flange 63 has a flat side for bearing against the bracket 34 whether the clamp segment 56 is disposed above or below the clamp segment 55.

Each flange also has a pair of spaced-apart and longitudinally elongated slots 64 to receive bolts 65 which extend therethrough as well as through laterally elongated slots 66 in the U-shaped bracket 34 to support the gang 30 from the beam (see FIGS. 4 and 6). Upon tightening and loosening of the nuts 65a on each bolt 65, the bracket 34 and thus the gang 30 supported therefrom may be shifted laterally by movement of each slot 66 along the bolts 65, or may be swung about a vertical axis by movement of the slots 64 in the clamp segment 56 along bolts 65. Obviously, both such adjustments may be made separately and independently of the adjustment necessary in adjusting the tilt of each gang, so that neither need be disturbed by the other.

The lateral offsetting of the flange 63 of the clamp segment 56 enables the gang supported therefrom to be moved from one extreme lateral position to another with respect to the beam 37. Thus, with the clamp segment 56 disposed beneath the clamp segment 55, as shown in FIGS. 1, 3, 4, 7 and 8, the flange 63 will be disposed on the right side of the beam, as seen from the front of the cultivator. Upon reversal of the upper and lower positions of the clamp segments, such flange will extend to the left of the beam, as shown in FIGS. 6 and 9. This, of course, is useful in making major adjustments of the lateral position of the front gangs when cultivating narrower or wider rows of crops. Furthermore, this particular adjustment may be made rapidly inasmuch as it only requires the detachment of the gang 30 from the flange 63, the loosening of the bolts 57 to permit the upper and lower positions of the clamp segments to be reversed, the tightening of the bolts 57, and the reconnection of the gang to the flange 63 of segment 56, which now occupies a laterally reversed position with respect to the beam.

It will also be seen from FIGS. 8 and 9 that this lateral reversal of the position of the gang may be made without disturbing its elevation with respect to the beam 37. Thus, as indicated by the broken lines of FIGS. 8 and 9, the center line of the beam 37 bisects the thickness of the flange 63 in that it is equally spaced vertically from the surfaces 63a and 63b. Each clamp segment 55 and 56 is also provided with an eye 67 thereon to receive a chain 68 suspended from channel 41 to permit the beam picked up and lowered, as desired.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A cultivator, comprising a frame adapted to be moved forwardly over the ground, a first gang of rotary hoes, means mounting said first gang from the frame for swinging about a transverse axis to rotatably engage the ground during forward movement of the frame, a pair of additional gangs of rotary hoes, means mounting each such additional gang from the frame for swinging about a transverse axis to rotatably engage the ground rearwardly of and on one opposite side of the engagement of the first gang with said ground during said forward movement of the frame, and means for adjusting and fixing the angular relation of the axis of rotation of the rotary hoes of each of said first and additional gangs with respect to the ground level to dispose the ground engaging ends of said rotary hoes in common planes tilted from one side to the other of a level position.

2. A cultivator, comprising a frame adapted to be moved longitudinally over the ground, a longitudinally extending beam pivotally connected to the frame for swinging about a transverse axis, a gang of rotary hoes each comprising a spider having radially extending legs bent at their outer ends for engaging a row of crops during forward movement of the frame, a clamp supporting the gang and releasably connected about said beam for rotation into positions in which the bent ends of the spiders of the gangs may be reversed between positions in which they are directed forwardly or rearwardly as they engage the row, and means carried by the frame for turning the ground onto the crops on each opposite side and rearwardly of the engagement therewith of said gang during said forward movement of the frame.

3. A cultivator, comprising a frame movable longitudinally over the ground, a first gang of rotary hoes, a beam pivotally mounted on the frame for swinging about a transverse axis, a clamp supporting the first gang from the beam to rotatably engage the ground forwardly of such axis, said clamp being releasably connectable to the beam with the major portion of said gang to one side or the other of the longitudinal axis of said beam, a pair of additional gangs of rotary hoes, a pair of beams pivotally mounted on the frame to support each additional gang for swinging about a transverse axis to rotatably engage the ground rearwardly of said last-mentioned axis on each opposite side and rearwardly of the ground engaged by the first gang, the axis of rotation of the last-mentioned beams being disposed forwardly of the axis of rotation of the first-mentioned beams to dispose them in side-by-side relation to said first-mentioned beam.

4. A cultivator of the character defined in claim 3, including means for adjusting the lateral position of the first gang with respect to the clamp from which it is supported.

5. A cultivator of the character defined in claim 3, including means for adjusting the pivotal mounting of the beam for the first gang in a lateral direction.

6. A cultivator of the character defined in claim 3, wherein the clamp includes longitudinally split segments releasably connected one above the other about the beam, and means on one of said split segments for supporting said first gang at the same level with respect to said beam regardless of which one is above the other.

7. A cultivator of the character defined in claim 6, wherein said beam for the first gang has a portion of circular cross section over which the clamp segments may be rotated to dispose said gang in a desired tilted relation with respect to the ground level.

8. A cultivator of the character defined in claim 6, wherein the segments of the clamp for the first gang are recessed for fitting about the beam, and the supporting means on the one segment comprises a flange, said flange and first gang having openings therein to receive bolts for supporting said gang with its major portion laterally offset from the longitudinal axis of the beam, and the openings in one of said flange and gang being longitudinally elongated to permit said gang to be swung about a vertical axis.

References Cited by the Examiner

UNITED STATES PATENTS

| | | | |
|---|---|---|---|
| 553,100 | 1/96 | Brunnemer | 172—600 X |
| 604,992 | 5/98 | Little | 172—603 X |
| 805,252 | 11/05 | Winters | 172—743 X |
| 888,635 | 5/08 | Morris | 172—743 X |
| 1,033,330 | 7/12 | Lindgren | 172—600 |
| 1,042,991 | 10/12 | Waterman | 172—600 |
| 1,169,127 | 1/16 | Craddock | 172—600 X |
| 1,510,638 | 10/24 | Weeks | 172—160 |
| 1,532,986 | 4/25 | Branson | 172—551 |
| 1,616,886 | 2/27 | Chase et al. | 172—600 |
| 1,760,940 | 6/30 | English | 172—600 |
| 1,786,863 | 12/30 | Peterson | 172—600 |
| 2,191,537 | 2/40 | Miller | 172—586 X |
| 2,199,674 | 5/40 | Ronning | 172—708 X |
| 2,308,281 | 1/43 | Green | 172—551 |
| 2,617,343 | 11/52 | Warne | 172—577 X |
| 2,767,632 | 10/56 | Whittington | 172—587 X |
| 2,994,387 | 8/61 | Lehman et al. | 172—600 X |

FOREIGN PATENTS 1,070,866  12/59  Germany.

ANTONIO F. GUIDA, *Acting Primary Examiner.*

A. JOSEPH GOLDBERG, T. GRAHAM CRAVER,
*Examiners.*